United States Patent
Wavish et al.

[11] Patent Number: 5,890,146
[45] Date of Patent: Mar. 30, 1999

[54] ADAPTIVE PROCESS MODELLING AND CONTROL

[75] Inventors: Peter R. Wavish, West Hoathly; David M. Connah, Reigate, both of England

[73] Assignee: U.S. Philips Corporation, New York, N.Y.

[21] Appl. No.: 840,359

[22] Filed: Apr. 29, 1997

[30] Foreign Application Priority Data

May 2, 1996 [GB] United Kingdom .................. 9609189

[51] Int. Cl.⁶ ................................................ G06F 15/18
[52] U.S. Cl. ............................................. 706/46; 706/10
[58] Field of Search ................................ 706/46, 47, 48, 706/49

[56] References Cited

U.S. PATENT DOCUMENTS

| | | | |
|---|---|---|---|
| 5,261,041 | 11/1993 | Susman | 395/152 |
| 5,283,856 | 2/1994 | Gross et al. | 706/46 |
| 5,369,570 | 11/1994 | Parad | 364/401 |
| 5,446,653 | 8/1995 | Miller et al. | 364/401 |
| 5,555,346 | 9/1996 | Gross et al. | 706/46 |
| 5,586,025 | 12/1996 | Tsuji et al. | 706/46 |
| 5,596,695 | 1/1997 | Hamada et al. | 395/333 |

FOREIGN PATENT DOCUMENTS 9527952 10/1995 WIPO .
WO 97/12318 4/1997 WIPO ................. G06F 9/44

OTHER PUBLICATIONS

Woodbury et al., Self–Activation and representation in systems integration, 1990 IEEE International Conference, pp. 48–51, Dec. 1990.

Castagnetti, Static Analysis of a parallel logic language based on the blackboard model, Parallel distribution computing, vol. 13, pp. 412–423, Dec. 1991.

"Patent Abstracts of Japan", The Patent Office Japanese Government, vol. 18, No. 57, Jan. 28, 1994, P–1684.

*Primary Examiner*—Robert W. Downs
*Assistant Examiner*—Sanjiv Shah
*Attorney, Agent, or Firm*—Gregory L. Thorne

[57] ABSTRACT

A rule-based data processing system includes a memory having stored therein a number of groups of agents. Each group is defined by respective sets of rules, with the system running the respective sets of rules in parallel. The agents are in two clusters: "script agents" which are arranged as a sequentially enabled chain and "operator agents" arranged to carry out selected procedural steps. The selection of the procedural step is made within each operator agent based on of one or more external factors, and is triggered by enablement of a script agent of the sequence prior to that script agent carrying a marker identifying an operator agent.

18 Claims, 3 Drawing Sheets

ADAPTIVE PROCESS MODELLING AND CONTROL

BACKGROUND OF THE INVENTION

1. Field of the Invention

The present invention relates to rule-based data processing apparatuses and in particular to those having stored therein one or more agents, the or each agent being defined by a set of rules, and each rule being in the form of a condition portion and an associated response portion, with the condition portion of each rule requiring the presence of one or more specified behaviour states or external inputs and the apparatus comprising means for responding to any said condition being satisfied by generating the associated response. The invention additionally, but not exclusively, relates to process control and interactive entertainment apparatuses based around such a rule-based data processing apparatus.

2. Description of the Related Art

Rule-based processor systems may support behaviour languages in which behaviours are either simple operations performed on a value, or rules, where a rule defines logical and temporal relations between events (behaviour state changes). Events associated with the condition portion of a rule—also known as the left hand side behaviours of a rule—cause subsequent events associated with the response portion (right hand side behaviour) of the rule. An example of such a rule-based real time language is Real Time ABLE (RTA), described in "Simulating and Implementing Agents and Multiple Agent Systems" Proceedings of the European Simulation Multiconference 1991 at pages 226–231. ABLE stands for Agent Behaviour LanguagE and is a highly concurrent production rule language for simulating agents and multiple agent systems, and provides for tighter integration of time with the production rule system. A further example of a rule-based language is given in "The Behaviour Language; User's Guide" by R A Brooks, Al Memo 1227, Massachusetts Institute of Technology Artificial Intelligence Laboratory, April 1990.

Whilst rule-based languages provide greater flexibility than more traditional programming languages, their propagating nature can still lead to rigidity in, for example, process control where activation of process stages is strictly controlled in terms of starting, intermediate and finishing rule conditions and responses with little flexibility for unprogrammed events. Modification of the process to accommodate even minor procedural changes is also not a simple matter, sometimes requiring recompilation of the whole program to accommodate a small change in a programmed delay or procedure start time.

Rule-based systems have been suggested as particularly suited for artificial intelligence applications where more complex behavioural simulations may be implemented in interconnected networks or modules of agents. The above-mentioned problems recur however when modelling interaction scenarios between virtual "actors", each in the form of a compound group of interconnected agents, with different agents governing the virtual actors response to environmental factors and the actions of other virtual actors. If a "script" is to be followed, all of the virtual actors required conditions and potential responses must be programmed into the script such that the interaction becomes a rigidly controlled process with little or no variation in successive runnings. From an observers point of view, the 'interaction' between the virtual actors is predictable and unrealistic.

SUMMARY OF THE INVENTION

It is therefore an object of the present invention to provide a configuration of data processing apparatus which may provide the basis for more flexible control applications.

It is a further object of the invention to provide a means for process control, based on such a data processing apparatus, which is readily adaptable to changes in procedure.

It is yet a further object of the present invention to provide an interactive entertainment apparatus where characters modelled as compound agents may interact with each other whilst following a script in a relatively flexible and realistic manner.

In accordance with the present invention there is provided a rule-based data processing apparatus comprising a processor coupled with memory means having stored therein a first and at least one further group of agents, each group being defined by respective sets of rules, and the processor being arranged to run said respective sets of rules in parallel, characterised in that the agents of the first group (hereinafter "script agents") are arranged as a chain being enabled in sequence, said at least one further group of agents (hereinafter an "operator agent") is arranged to carry out a selected one of two or more procedural steps, with the selection being made within the operator agent on the basis of one or more external factors, and the selection operation within the operator agent is triggered prior to the enablement of a script agent carrying a marker identifying the operator agent, and subsequent to the enablement of a preceding script agent of the sequence.

By providing the different classes of agent, the script or procedure defined by the string of script agents may be modified without affecting the operator agents. Similarly, the operator agents may be modified in terms of the skill or process they perform without amendment of the script which simply calls for the skill at particular times. Quick substitution of operator agents with different skills or skill levels provides the system with a high degree of flexibility. The apparatus may comprise two or more operator agents with at least one of the said external factors (on the basis of which one of the operator agents makes the said selection), being the current setting of a controllably variable value set by another of the operator agents. Thus, not only are the operator agents arranged to interact with the progressive string of script agents, they are also configured to interact with each other.

The or each of the script agents may be configured to identify when the or each operator agent for which it carries a marker has made the said selection following triggering by the enablement of a preceding script agent, and may be configured to modify an internal behaviour value on making said identification. By setting of this internal behaviour value, which may be a simple flag, it becomes a relatively simple matter to determine the progress of the process or script. Additionally, based on this internal monitoring, each of the script agents may suitably be configured to unload itself from the memory means following its enablement and the said modification of internal behaviour value, in other words determining when the process stage it is directing has been carried out and then cancelling itself as redundant.

One or more of the script agents may include an internal mechanism operable to generate a first representation of factors external to the script agent and referred to by functions supported by that script agent, and to generate a second representation of said functions supported by the script agent, to compare the said first and second representations, and to generate and output an indication of any inconsistency between said first and second representations. This local diagnostic feature would enable a script agent to compare its own input/output conditions with output/input conditions specified for neighboring script agents to check for mismatches. Such a facility would be of particular use where a sequence of script agents was to be edited: the facility would reduce the necessity for recompilation of the script agents as a whole.

According to one embodiment of the invention, the above-described rulebased data processing apparatus is provided with an external interface means coupled with the data processor thereof to provide a process control apparatus, with said external interface means being configured to control a plurality of external processes linked thereto on triggering of respective operator agents.

According to another embodiment of the present invention, the abovedescribed rule-based data processing apparatus is configured as an interactive entertainment apparatus, having output means coupled with the data processor and arranged to generate an indication of the operation of the or each of said operator agents. In such an embodiment, the output means may suitably be means operable to generate an image of a virtual environment and to animate one or more modelled features in said environment, with the animation of the or each of said one or more modelled features being controlled by a respective operator agent. At least one further agent or group of agents may be provided within the virtual environment (for example controlling environmental artifacts and/or unscripted characters), with the or each said further agent being triggered by actions initiated by one or any of said operator agents.

Further features and advantages of the present invention are recited hereinafter and in the attached claims, to which reference should now be made.

BRIEF DESCRIPTION OF THE DRAWINGS

Preferred embodiments of the present invention will now be described, with particular reference to RTA agents by way of example only, and with reference to the accompanying drawings, in which.

DESCRIPTION OF THE PREFERRED EMBODIMENTS

Figure 1:
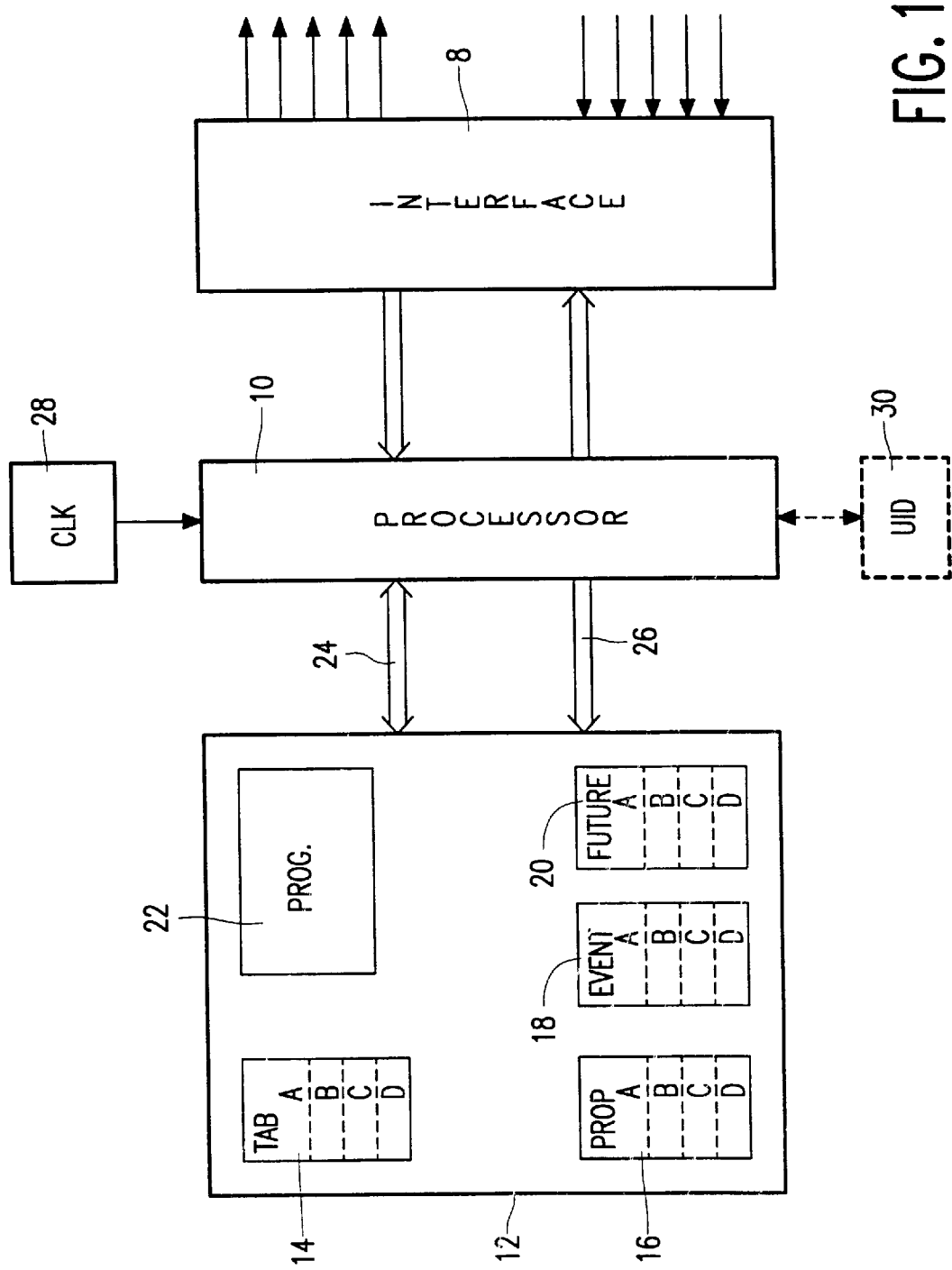
FIG. 1 is a block schematic diagram of a rule-based data processing apparatus according to an embodiment of the present invention.

FIG. 1 shows apparatus embodying the present invention, comprising a processor 10 operating on a compiled asynchronous logic circuit representation defined by a population of RTA rules which, through an interfacing link 8, is enabled to control an application such as an industrial process or multi-character interactive animation. The specific features of the application controlled via the interfacing link are not required for an understanding of the operation of the present invention and, except where such an application serves to illustrate the operation, they will not be described further.

The processor 10 has associated with it a random access memory (RAM) 12 which provides a number of discrete storage areas, a first of which 14 holds a table containing details of the various elements of the asynchronous logic circuit representation of the compiled population of RTA rules, with discrete areas of the table holding the details for script agents 14A and for each of the operator agent groups (in this example three) 14B, 14C, 14D, as will be described. The compilation of RTA rules to an asynchronous logic circuit representation is described in greater detail in our European patent application EP-A-0704077 (PHB 33903) the disclosure of which is incorporated herein by reference.

Each of the behaviors (register elements), time annotations (delay elements) logic function elements and rules forming the asynchronous logic circuit representation has a row in the table 14. Each row in the table identifies the element number, a state flag of the device, a queued status flag of the device, the internal status, and a propagate function start address. When the state of the element to which the row of the table relates changes (referred to herein as an event), a propagate function is executed to effect any appropriate changes to all of the elements which may be affected by such a change. These propagate functions are conveniently arranged at certain memory locations or start addresses. Changing the state of elements by propagation in such a manner rather than by searching for all of the elements affected by an event allows the apparatus to operate efficiently.

The propagate functions starting at the start addresses are stored in another area 16 of the RAM 12; the RAM also provides further storage areas for future element state changes 18 and an event stack 20. As with the table 14, each of the memory areas 16, 18, 20 is divided into discrete areas for the script agents (suffix A) and for the different operator agents (suffix B, C, D). A program store 22 holds the command structure governing the compilation of the asynchronous logic circuit for each of the agents, script or operator. The program store 22 and the propagate functions 16 could, if desired, be stored in another memory device, for example a read-only memory.

The RAM 12 is connected to the processor 10 by a data bus 24 and an address bus 26 in known manner. Also in known manner, a clock (CLK) 28 is connected to the processor. The processor 10 operates on the compiled representation according to the command structure from program store 22 with propagation of state changes through the representation equating to responding to the satisfaction of condition behaviors by generating one or more further behaviors defining the associated response as specified by the rule populations which define the compiled circuit representation. Optionally, a user interface device (UID) 30 may be provided to enable input of control data and commands directly to the processor 10, if required by the application.

The storage area 18 for future agent element state changes is arranged, for the script agents and for each of the operator agent groups, as a two row table containing a plurality of time slots and element numbers. Any number of elements numbers can be stored to correspond to a particular time slot and the states of these elements will all be changed during that time slot. The table may be arranged for a consecutive sequence of time slots, but it is preferred to use a stack containing only those time slots for which element numbers are stored, with the facility to insert element numbers and time slots as required due to operation of the program.

Generally, all of an agent's element state changes except those corresponding to delay elements and behaviour state changes will be executed in the current time slot although other element state changes can be also delayed if desired. Those element state changes which are to occur without a time delay may be placed in the event stack 20 for execution in the near future—i.e. later in the current time slot, but before moving to the next time slot for which an event is specified.

A particular use for the process control provided by the present invention is in interactive entertainment or artificial intelligence applications. This addresses the problem of how to create a performance of a scripted scenario using a set of operator agents as virtual actors playing, for example, characters in a computer game. The virtual actors are required to perform a script autonomously, as real actors do, rather than being directly controlled by it. In accordance with an aspect of the present invention, the script is represented at run-time as a set of autonomous agents and so plays an active part in the operation of the system, with the virtual actors being distinct groupings of agents whose activity is partly determined by the situation in which they are embedded (and which their activity is helping to construct) and partly by the script which they enact.

As with theatrical rehearsals or read-throughs, the control of the performance of the script is distributed amongst the virtual actors, each of whom is responsible for identifying the sentence in the script to be performed and for identifying the cue for performing it—typically when the previous sentence has been performed, where a sentence may correspond to a speech by an actor, or a stage direction.

The individual or grouped operator agents comprising the virtual actors, being controlled by simple situated agents, require the script to be translated into a form that is "intelligible to" (capable of implementation by) them. To achieve this, the written script is translated into a linked chain of script agents, each one of which is concerned with, and represents, a particular sentence in the script. Referring back to FIG. 1, the data for these script agents is held in the area 14A of the table 14, with the further discrete areas of the table 14B, 14C, 14D holding the details for the respective virtual actors. As will become clear, each virtual actor may comprise a highly complex arrangement of interlinked agents governing not only how the virtual actor is to physically handle a task, but also behavioural aspects which may in turn affect the physical operation. Other virtual actors however may be little more than theatrical "props" such as a door which may be open or closed or a book which may be passed from one character to another.

Figure 2:
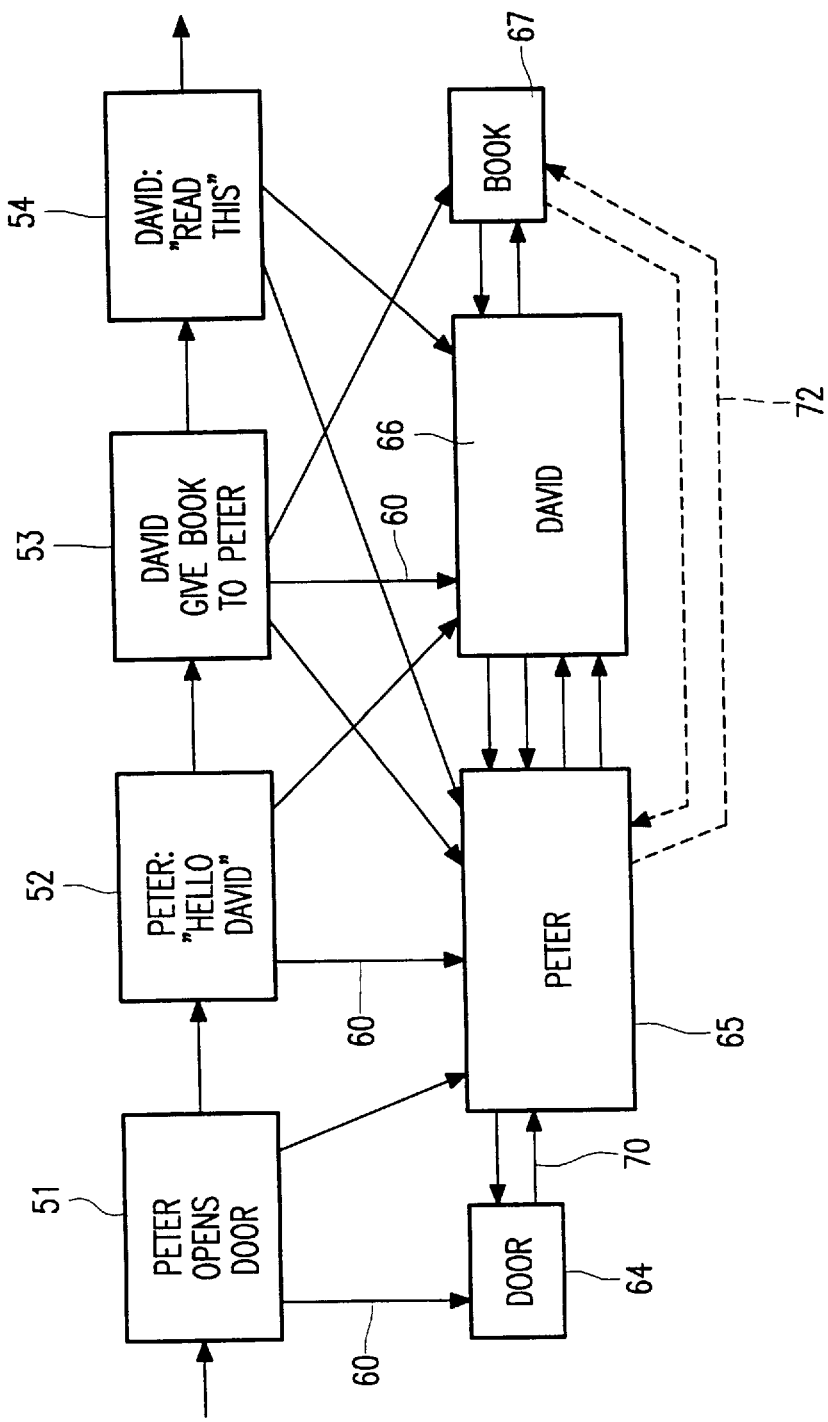
FIG. 2 is a schematic diagram illustrating a sequence of script agents linked to associated operator agents.

As schematically illustrated in FIG. 2, each script agent 51–54 contains within it markers 60 on the actor performing it, and on the other actors and agents that are involved in its performance. The Figure represents a brief extract from a scripted exchange between two virtual actors (Peter and David) during the course of which Peter opens a door (to a room where David is) and greets him: David responds by handing a book to Peter and telling him to read it. This is broken down into four script agents 51–54 with respective markers to the virtual actor/operator agents 64–67 representing respectively a door 64 (to the room where David is), Peter 65, David 66 and the book 67. The first script agent 51 ("Peter opens door") has markers 60 on both Peter 65 and the door 64, which Peter may be required to open using internal skills and in a "style" determined by others of his internal characteristics. The exact form of interaction between the 'Peter' and 'door' virtual actors (represented by links 70) is not explicitly scripted but instead merely initiated by the script.

The second script agent 52 (Peter says "Hello David") has markers to both the 'Peter' agent 65 and the 'David' agent 66. Whilst David does not have a direct role from script agent 52, his presence within the room is required if Peters utterance is to have any meaning; the completion of actions associated with the script agent 52 is also the cue for the actions of David as scripted in the following script agent 53 ("David gives book to Peter"), which script agent has markers 60 on the agents for David 66, Peter 65 and the book 67. In terms of the interaction between the virtual actors, that between Peter and the door (represented by links 70) ceases when the storyline moves to script agent 52 which does not have a marker on the door 64, whilst the interaction between Peter and the book (represented by dashed links 72) is not established until script agent 53 is reached which has markers on both Peter and the book. Script agents also have additional internal state and behaviour, described below, which may for instance register whether the action that they represent has been performed.

In operation, each of the virtual actors performs the script by searching forwards through the chain of script agents for the next action it is to perform, and searching backwards from that point to find the script agent corresponding to the cue for its next action, generally (but not necessarily) the preceding script agent. From the markers held by the two script agents it is a relatively simple matter for the virtual actor agents to determine the virtual actor from whom it takes its cue, and the virtual actors and objects with respect to which its action needs to be performed.

The particular advantage of implementing the script agents as autonomous agents is that a number of extra system features become easy to implement by adding extra behaviour to the script agents. For example, the script agents can monitor their own performance, either by a behaviour mechanism directly noting when the script segment has been performed, or by monitoring the virtual environment for particular conditions or conjunctions of conditions satisfying the starting conditions for the next script agent.

Script agents can prompt or direct the actor performing them by directly asserting a specific condition or conditions, and similarly can cue the next actor agent. By use of an established RTA mechanism, the script agents can unload themselves after they have been performed in order to save memory space.

Figure 3:
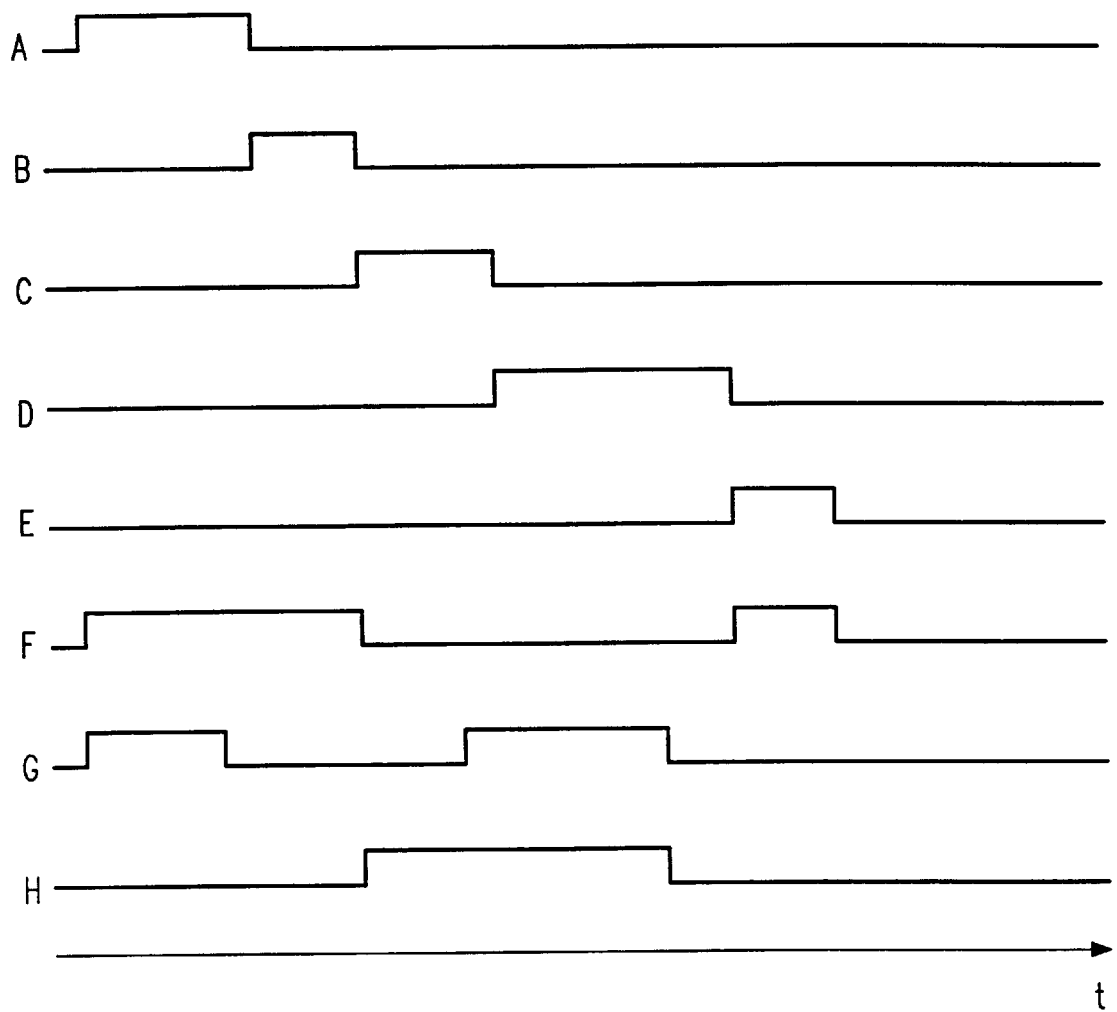
FIG. 3 is a timing diagram illustrating the operational inter-relationship of a number of script and operator agents.

To enhance the system functionality, the script and actor agents may be arranged to collectively display a time map of the performance by individually drawing time-bars corresponding to their own individual performance as shown in FIG. 3, where traces A to E represent script agents and traces F to H represent virtual actors. The display device (not shown) may be a part of the UID 30 (FIG. 1) or more suitably may be driven via the interfacing link 8. This graphical user interface provides a way of communicating with the director or designer concerning the agents content or performance, and can provide a means of previewing or checking the script by propagating a "present moment" signal down the chain of fragments (along the t-axis) delayed in time by each agent to correspond with the expected duration of the agent's performance.

The individual script agents are suitably configured to check for consistency between themselves and their neighbors, for example comparing cues against markers held by the next script agent, such as to provide an internal diagnostic function for modified or inserted sections of the script. If suitably configured, the script agents may be arranged to generate reports on the sentences in the written script they carry, with annotations representing desired modifications to their performance. Such annotations might, for example, indicate that it was not the only sentence being spoken at the time, thereby indicating that more time should be allowed for the speech from the preceding script agent. In a further development, the script agents may be operable to develop additional script agents to fill gaps in the script: for example, a consistency check between a sequential pair of script agents shows a character to be in two different locations—this may lead to the generation of an additional script agent between the existing pair requiring the character to travel from the first to the second location.

By enabling the script at run-time as a set of autonomous agents, rather than as static objects, the additional functionality described above may be simply implemented. In order to further enhance the functionality, steps may be taken to deal with referential expressions in the script such as "the red book on the table" which at the time the script object is generated may have no references. A proposed solution is to have another set of autonomous agents which stand in for the objects referred to, and so can be pointed to by markers in the script agents, but can also autonomously connect themselves to the objects and places that they represent in the simulated 3-D world in which the script is performed. This technique is covered in greater detail in our co-pending United Kingdom Patent Application No 9609197.0.

From reading the present disclosure, other modifications will be apparent to persons skilled in the art. Such modifications may involve other features which already known in the field of data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A rule-based data processing apparatus comprising:
   a processor; and
   a memory coupled to said processor and configured to store a first group of agents and at least one further group of agents, with each of said first group of agents and said at least one further group of agents being defined by respective sets of rules, wherein
   said processor is configured to run said respective sets of rules in parallel,
   said agents of the first group are configured as script agents and are enabled in sequence,
   said at least one further group of agents is configured as operator agents that each carry out a selected one of a plurality of procedural steps, with selection of the procedural step being made within the operator agent on the basis of one or more factors that are external to said operator agent,
   each one of said script agents is configured to carry a marker for cueing at least one of said operator agents to perform said selected one of the plurality of procedural steps, and
   said operator agents are configured to perform the selection of said one of the plurality of procedural steps prior to cueing by said script agent.

2. Apparatus as claimed in claim 1, comprising two or more operator agents wherein at least one of said external factors, on the basis of which one of the operator agents makes said selection, is a current setting of a controllably variable value set by another of the operator agents.

3. Apparatus as claimed in claim 1, wherein each of said script agents is configured to identify when the operator agent or each operator agent for which it carries a marker has made said selection following triggering by enablement of a preceding script agent, and to modify an internal behaviour value on making said identification.

4. Apparatus as claimed in claim 3, wherein each of said script agents is configured to unload itself from said memory means following enablement and said modification of said internal behaviour value.

5. Apparatus as claimed in claim 1, wherein one or more of said script agents includes an internal mechanism operable to generate a first representation of factors external to said script agent and referred to by functions supported by said script agent, to generate a second representation of said functions supported by said script agent, to compare said first and second representations, and to generate and output an indication of any inconsistency between said first and second representations.

6. The apparatus of claim 1:
   wherein said script agent is a first script agent;
   wherein said operator agent is further configured to perform the selection of said one of the plurality of procedural steps subsequent to enablement of a second script agent of the sequence; and
   wherein said second script agent precedes said first script agent in the sequence.

7. A process control apparatus comprising:
   a rule-based data processor;
   an interface coupled with said processor; and
   a memory coupled to said processor and configured to store a first group of agents and at least one further group of agents, with each of said first group of agents and said at least one further group of agents being defined by respective sets of rules, wherein
   said processor is configured to run said respective sets of rules in parallel,
   said agents of the first group are configured as script agents and enabled in sequence,
   said at least one further group of agents are configured as operator agents that each carry out a selected one of a plurality of procedural steps, with selection of the procedural step being made within the operator agent on the basis of one or more factors that are external to said operator agent,
   each one of said script agents is configured to carry a marker for cueing at least one of said operator agents to perform said selected one of the plurality of procedural steps,
   said operator agents are configured to perform the selection of said one of the plurality of procedural steps prior to cueing by said script agent, and
   said interface is configured to control a plurality of external processes linked thereto on triggering of respective operator agents.

8. Apparatus as claimed in claim 7, comprising two or more operator agents wherein at least one of said external factors, on the basis of which one of the operator agents makes said selection, is the current setting of a controllably variable value set by another of the operator agents.

9. Apparatus as claimed in claim 7, wherein each of said script agents is configured to identify when the operator agent or each operator agent for which it carries a marker has made said selection following triggering by the enablement of a preceding script agent, and to modify an internal behaviour value on making said identification.

10. Apparatus as claimed in claim 9, wherein each of said script agents is configured to unload itself from said memory means following enablement and said modification of said internal behaviour value.

11. Apparatus as claimed in claim 7, wherein one or more of said script agents includes an internal mechanism operable to generate a first representation of factors external to said script agent and referred to by functions supported by said script agent, to generate a second representation of said functions supported by said script agent, to compare said first and second representations, and to generate and output an indication of any inconsistency between said first and second representations.

12. An interactive entertainment apparatus comprising:
   a rule-based data processor;
   an output device coupled to said processor; and
   a memory coupled to said processor and configured to store a first group of agents and at least one further group of agents, with each of said first group of agents and said at least one further group of agents being defined by respective sets of rules, wherein
      said processor is configured to run said respective sets of rules in parallel,
      said agents of the first group are configured as script agents and enabled in sequence,
      said at least one further group of agents are configured as operator agents that each perform a selected one of a plurality of procedural steps, with selection of the procedural step being made within the operator agent on the basis of one or more factors that are external to said operator agent,
      each one of said script agents is configured to carry a marker for cueing at least one of said operator agents to perform said selected one of the plurality of procedural steps,
      said operator agents are configured to perform the selection of said one of the plurality of procedural steps prior to cueing by said script agent, and
      said output device is configured to generate an indication of the selected one of the plurality of procedural steps for each of said operator agents.

13. Apparatus as claimed in claim 12, comprising two or more operator agents wherein at least one of said external factors, on the basis of which one of the operator agents makes said selection, is a current setting of a controllably variable value set by another of the operator agents.

14. Apparatus as claimed in claim 12, wherein each of said script agents is configured to identify when the operator agent or each operator agent for which said script agent carries a marker has made said selection following triggering by enablement of a preceding script agent, and to modify an internal behaviour value on making said identification.

15. Apparatus as claimed in claim 14, wherein each of said script agents is configured to unload itself from said memory means following enablement and said modification of said internal behaviour value.

16. Apparatus as claimed in claim 12, wherein one or more of said script agents includes an internal mechanism operable to generate a first representation of factors external to said script agent and referred to by functions supported by said script agent, to generate a second representation of said functions supported by said script agent, to compare said first and second representations, and to generate and output an indication of any inconsistency between said first and second representations.

17. Apparatus as claimed in claim 12, wherein said output means comprises means operable to generate an image of a virtual environment and to animate one or more modeled features in said environment, the animation of the modelled features or each of said one or more modeled features being controlled by a respective operator agent.

18. Apparatus as claimed in claim 17, further comprising at least one further agent or group of agents, the further agent or each said further agent of the group of agents being triggered by actions initiated by one or any of said operator agents.

* * * * *